(12) United States Patent
Wurzer

(10) Patent No.: US 11,427,109 B1
(45) Date of Patent: Aug. 30, 2022

(54) TRUCK SEAT ADAPTER

(71) Applicant: Adam J. Wurzer, Carroll, IA (US)

(72) Inventor: Adam J. Wurzer, Carroll, IA (US)

( * ) Notice: Subject to any disclaimer, the term of this patent is extended or adjusted under 35 U.S.C. 154(b) by 164 days.

(21) Appl. No.: 16/863,077

(22) Filed: Apr. 30, 2020

(51) Int. Cl.
*B60N 2/005* (2006.01)
*B60N 2/90* (2018.01)

(52) U.S. Cl.
CPC .............. *B60N 2/005* (2013.01); *B60N 2/919* (2018.02)

(58) Field of Classification Search
CPC .......... B60N 2/005; B60N 2/919; B60N 2/04; B60N 2002/04
USPC .......................................... 296/65.01, 65.03
See application file for complete search history.

(56) References Cited

U.S. PATENT DOCUMENTS

| | | | | |
|---|---|---|---|---|
| 4,191,399 A | * | 3/1980 | Garvey | B60N 2/4221 |
| | | | | 180/282 |
| 5,244,178 A | * | 9/1993 | Stewart | B60N 2/005 |
| | | | | 248/300 |
| RE38,845 E | * | 10/2005 | Odagaki | B60N 2/01 |
| | | | | 296/65.03 |
| 8,282,149 B2 | * | 10/2012 | Kniffin | B60N 2/501 |
| | | | | 296/65.02 |
| 9,073,451 B1 | | 7/2015 | Wurzer | |
| 2011/0121603 A1 | * | 5/2011 | Blatseas | B60N 2/01583 |
| | | | | 296/64 |
| 2021/0188132 A1 | * | 6/2021 | Shiraki | B60N 2/0705 |

FOREIGN PATENT DOCUMENTS

| | | | | |
|---|---|---|---|---|
| CN | 112009321 A | * | 12/2020 | |
| EP | 3594050 A1 | * | 1/2020 | ............. B60N 2/015 |
| FR | 3103419 A1 | * | 5/2021 | ............... B60N 2/08 |
| WO | WO 2019176841 | * | 9/2019 | ............... B60N 2/90 |

* cited by examiner

*Primary Examiner* — D Glenn Dayoan
*Assistant Examiner* — Kevin P Weldon
(74) *Attorney, Agent, or Firm* — Suiter Swantz pc llo

(57) ABSTRACT

A truck seat adapter which is designed to be positioned between the floor of the driver's compartment and the seat base of a driver's seat to enable the seat to be positioned rearwardly of the factory installed position to provide additional leg room for the driver or the passenger. The positioning of the adapter plate for the driver's seat enables the seat to be positioned so as to not interfere with the closing of the driver's door. In a second embodiment, the positioning of the adapter plate for the passenger's seat enables the seat to be positioned so as to not interfere with the closing of the passenger's door.

4 Claims, 8 Drawing Sheets

TRUCK SEAT ADAPTER

BACKGROUND OF THE INVENTION

Field of the Invention

This invention relates to a truck seat adapter and more particularly to a truck seat adapter which enables a truck seat to be moved rearwardly from the factory installed position to provide additional leg room for the driver of the truck. More particularly, this invention relates to a truck seat adapter which enables the driver's seat to also be moved inwardly so that the outer armrest thereof will not interfere with the closing of the driver's door. Even more particularly, this invention relates to a truck seat adapter which enables the passenger seat to also be moved inwardly so that the outer armrest thereof will not interfere with the closing of the passenger door.

Description of the Related Art

A conventional truck seat includes a seat base which is fixedly secured to the floor of the driver's cab or compartment by four bolts which extend downwardly from the seat base through the floor of the driver's compartment. The seat portion of the truck seat is slidably moved forwardly or rearwardly on the seat base. However, the seat portion is limited in its rearward movement by the seat base being secured in a fixed position to the floor of the driver's compartment. In many cases, the driver does not have sufficient leg room even if the seat is in its rearwardmost position with respect to the seat base. U.S. Pat. No. 9,073,451 provided a truck seat adapter which was designed to be positioned between the floor of the driver's compartment and the seat base of the truck to enable its seat to be positioned rearwardly of the factory installed position to provide additional legroom for the driver. The truck seat adapter of the '451 patent could also be used with the passenger seat.

Although the patented truck seat adapter has met with commercial success, it has been found that in some cases, when the patented truck seat adapter is used with certain driver's seats, the outer armrest of the driver's seat prevented the closing of the driver's door. The same is also true with respect to some passenger seats.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

The first embodiment of this invention includes a generally rectangular, flat adapter plate having a forward end, a rearward end, a first side, a second side, an upper surface and a lower surface. The adapter plate has a first bolt opening formed therein which is positioned adjacent the forward end of the adapter plate and which is positioned adjacent the first side thereof. The adapter plate also includes a second bolt opening formed therein which is positioned rearwardly of the first bolt opening in the adapter plate. The second bolt opening is positioned adjacent the first side of the adapter plate. The adapter plate also includes a third bolt opening formed therein with the third bolt opening being positioned adjacent the forward end of the adapter plate. The third bolt opening in the adapter plate is spaced inwardly of the first bolt opening thereof. The adapter plate also has a fourth bolt opening formed therein which is spaced rearwardly of the third opening in the adapter plate. The fourth bolt opening of the adapter plate is spaced inwardly of the second bolt opening of the adapter plate. The third and fourth bolt openings of the adapter plate are positioned therein approximately midway between the first and second sides of the adapter plate.

The first, second, third and fourth bolt openings of the adapter plate are configured to register with first, second, third and fourth bolt openings formed in the floor respectively. The adapter plate has a first set or row of spaced-apart adjustment openings, having internal threads, formed therein which are positioned rearwardly of the first bolt opening of the adapter plate. The adapter plate has a second set or row of spaced-apart adjustment openings, having internal threads, formed therein which are positioned rearwardly of the second bolt opening of the adapter plate.

The adapter plate also has a third set or row of spaced-apart adjustment openings, having the internal threads, formed therein which are positioned rearwardly of the third bolt opening of the adapter plate. The adapter plate also has a fourth set or row of spaced-apart adjustment openings, having internal threads, formed therein which are positioned rearwardly of the fourth bolt opening of the adapter plate.

The individual bolt openings of the first, second, third and fourth rows of adjustment openings are configured to selectively and threadably receive bolts extending downwardly from the seat base of the seat to enable the seat base and the seat to be selectively adjustably rearwardly positioned with respect to the first, second, third and fourth openings in the floor to increase the legroom for a driver. The adjustment plate of the first embodiment is positioned so that the left armrest of the driver's seat will not interfere with the closure of the driver's door.

In the second embodiment of the adapter plate of this invention, a first bolt opening is formed in the adapter plate which is positioned adjacent the forward end of the adapter plate and is positioned adjacent the second side of the adapter plate. The adapter plate has a second bolt opening formed therein rearwardly of the first bolt opening with the second bolt opening being positioned adjacent the second side of the adapter plate. The adapter plate of the second embodiment has a third bolt opening formed therein with the third bolt opening being positioned adjacent the forward end of the adapter plate. The third bolt opening of the adapter plate is spaced inwardly of the first bolt opening of the adapter plate. The adapter plate also has a fourth bolt opening formed therein which is spaced rearwardly of the third bolt opening. The third and fourth bolt openings of the adapter plate are positioned in the adapter plate approximately midway between the first and second sides of the adapter plate. The first, second, third and fourth bolt openings of the adapter plate are configured to register with the first, second, third and fourth bolt openings in the floor respectively.

The individual bolt openings of the first, second, third and fourth rows of adjustment openings are configured to selectively and threadably receive bolts extending downwardly from the seat base to enable the seat base and the passenger seat to be selectively adjustably rearwardly positioned with respect to the first, second, third and fourth bolt openings in the floor to increase the legroom for a passenger. The adapter plate of the second embodiment is configured so that the right armrest of the passenger's seat will not interfere with the closing of the passenger's door.

It is therefore a principal object of this invention to provide an adapter plate for truck seats.

A further object of the invention is to provide an adapter plate which may be used in combination with a truck seat to enable the truck seat to be moved rearwardly beyond its normal factory position to increase the legroom for the driver or the passenger.

A further object of the invention is to provide an invention of the type described which is easily retrofitted onto the floor of a truck cab between the floor of the cab and the seat base of a seat.

A further object of the invention is to provide an adapter plate for use with a driver's seat and for use with a passenger's seat.

A further object of the invention is to provide adapter plates for a driver's seat and a passenger's seat whereby the outer armrests of the driver's seat and the passenger's seat will not interfere with the closure of the driver's door and the closure of the passenger's door respectively.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 5 is a perspective view of the adapter plate of the first embodiment of this invention which is designed to be used with the driver's seat of a truck or the like;

FIG. 6 is a perspective view of the adapter plate of the second embodiment of this invention which is designed to be used with the passenger seat of a truck or the like;

FIG. 9 is a front perspective view illustrating the adapter plate of FIG. 5 securing a driver's seat of a truck or the like to the floor of the truck or the like; and FIG. 10 is a front perspective view illustrating the adapter plate of FIG. 6 securing a passenger seat of a truck or the like to the floor of the truck or the like.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

Figure 5:
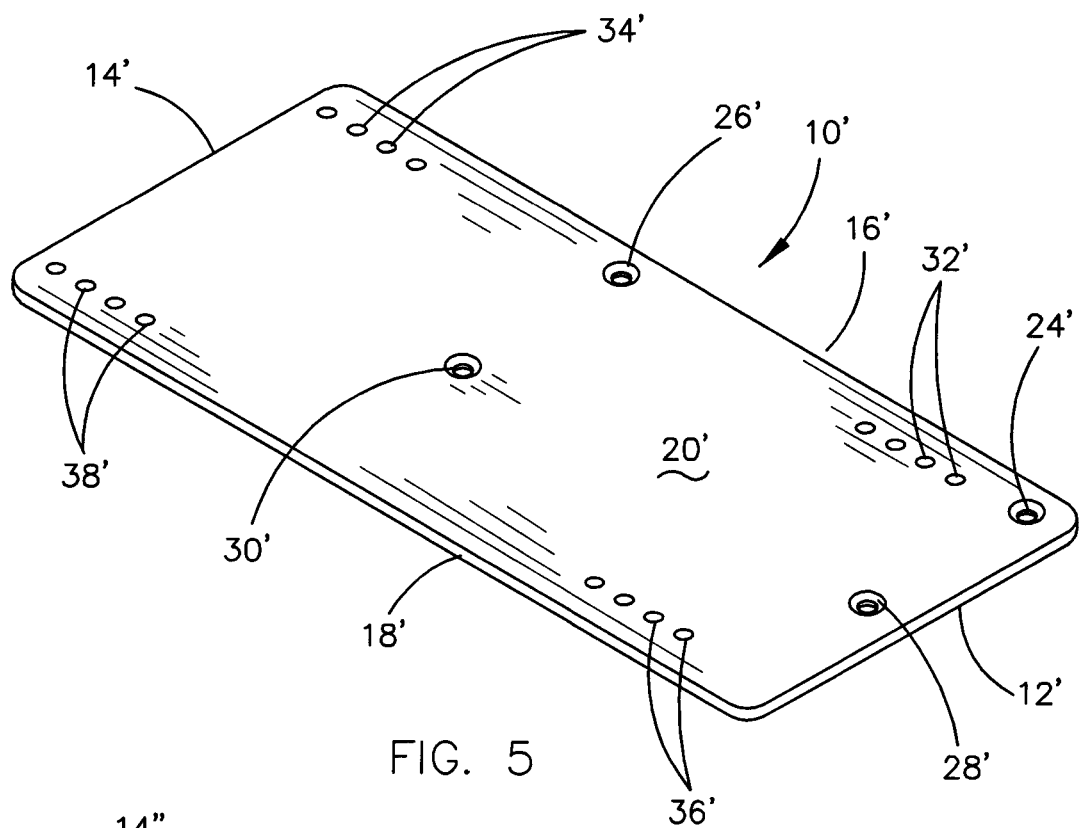
Figure 7:
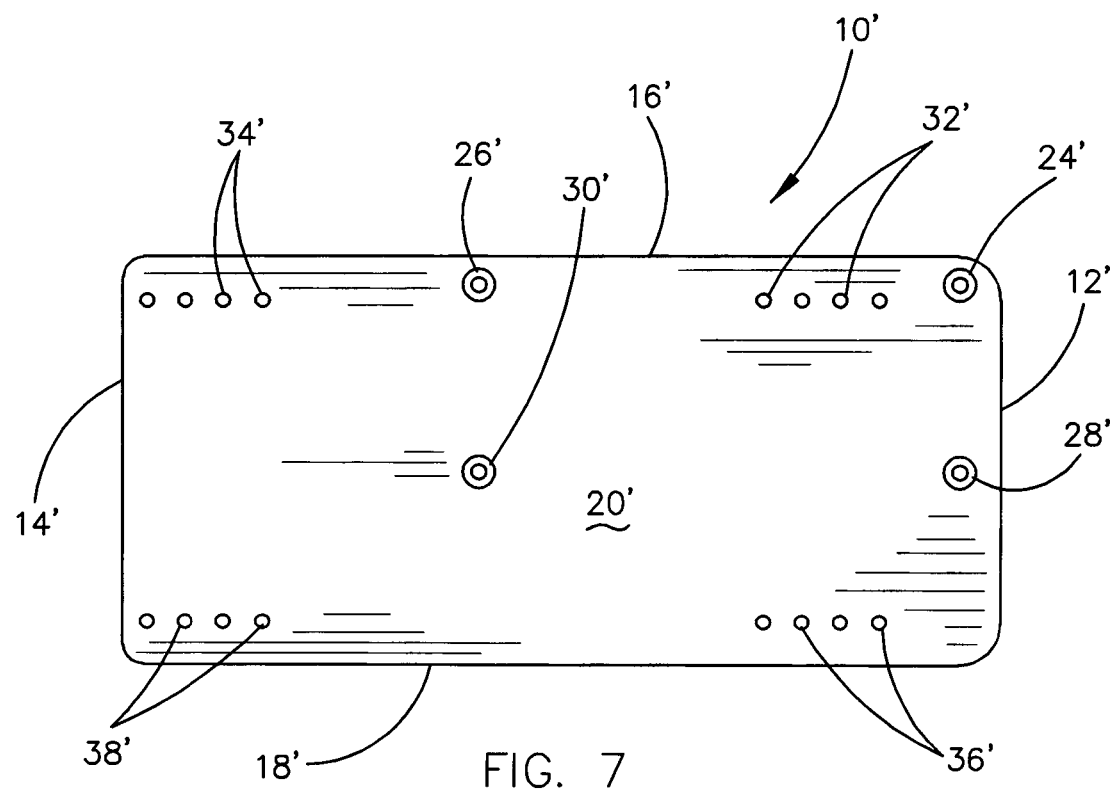
FIG. 7 is a top view of the adapter plate of FIG. 5.
Figure 9:
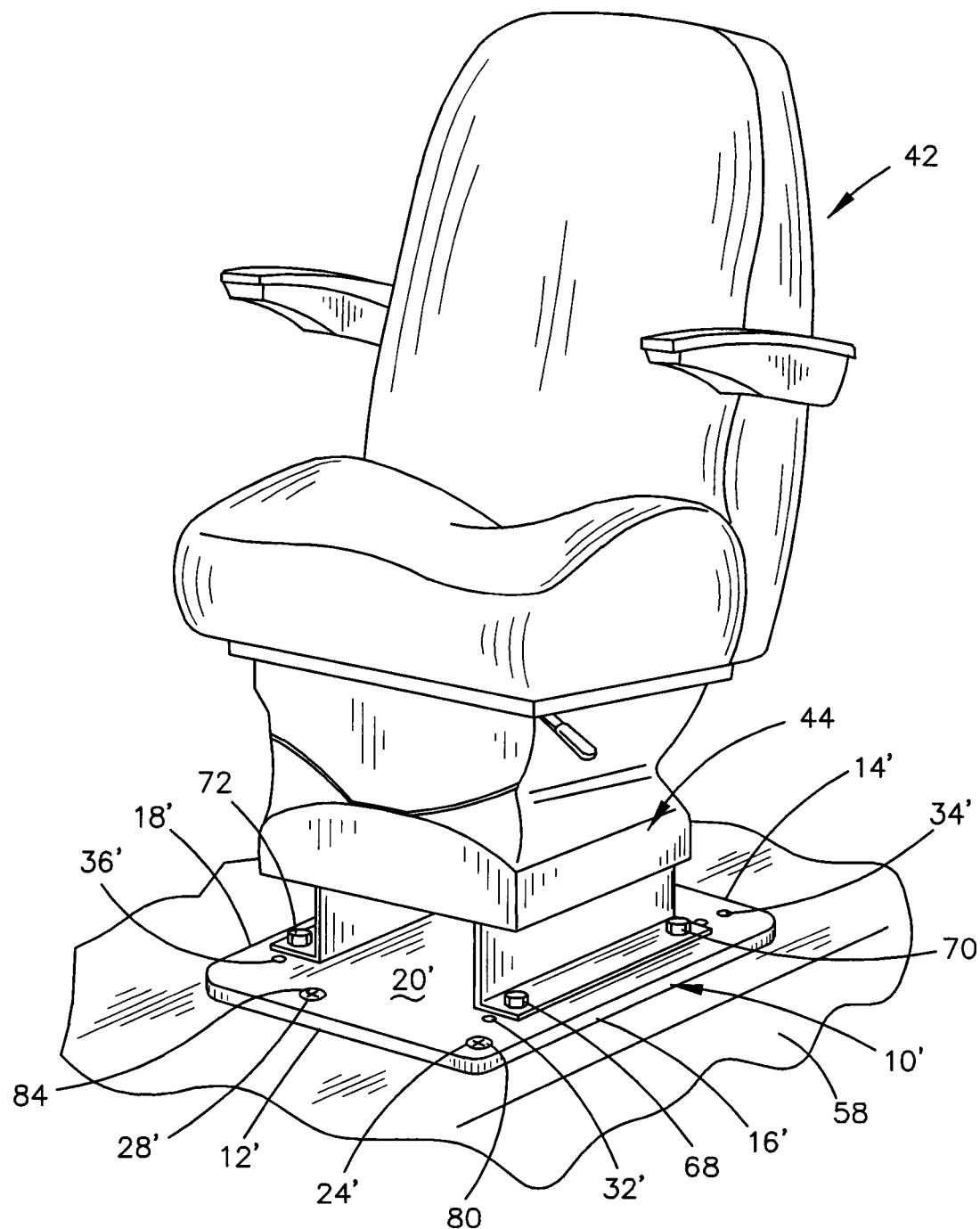

FIGS. 1-4 illustrate the prior art adapter plate 10 of U.S. Pat. No. 9,073,451, which is incorporated herein by reference thereto to complete this disclosure if needed. FIGS. 5, 7 and 9 illustrate a first embodiment of this invention wherein the adapter plate thereof is designated with the reference numeral 10'. The structure of adapter plate 10', which is identical to the structure of prior art adapter plate 10, is designated with "'". The adapter plate 10' is designed to be used with a driver's seat.

Figure 6:
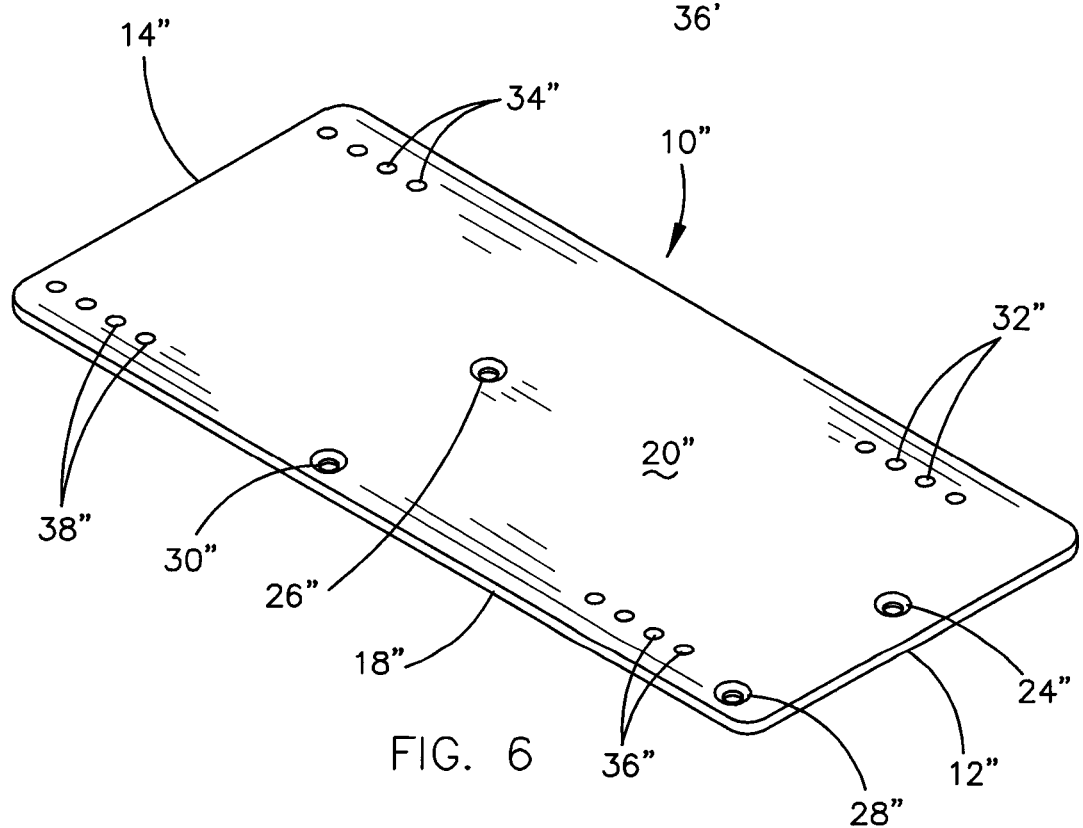
Figure 8:
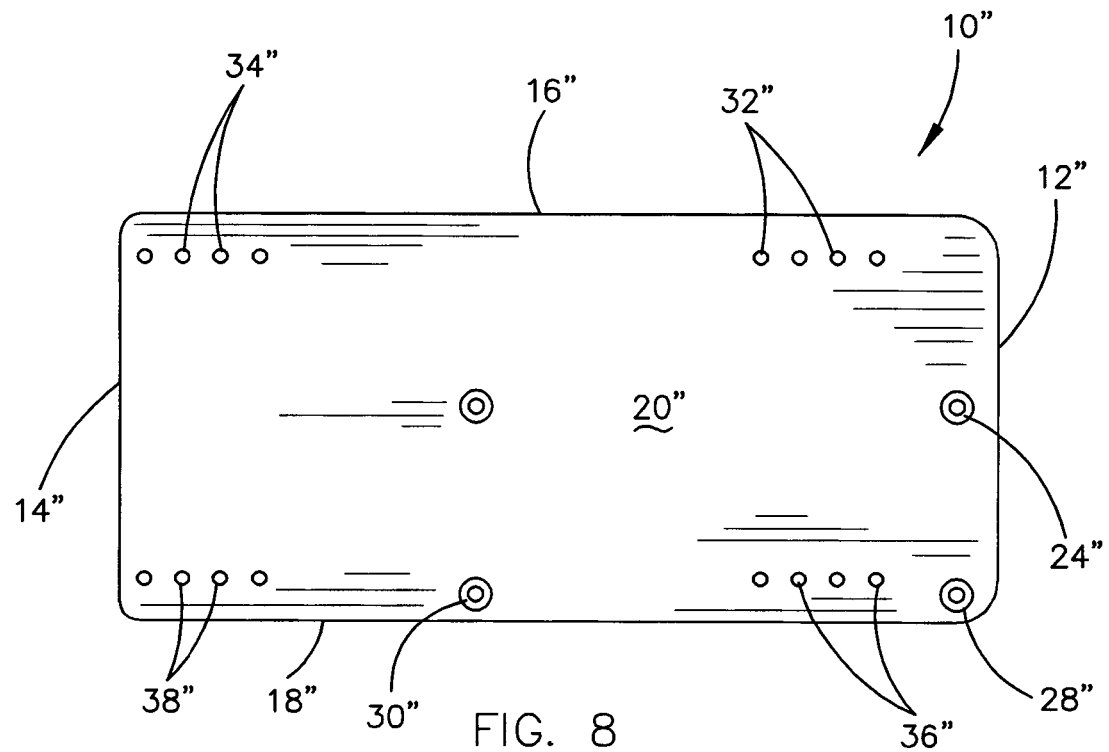
FIG. 8 is a top view of the adapter plate of FIG. 6.
Figure 10:
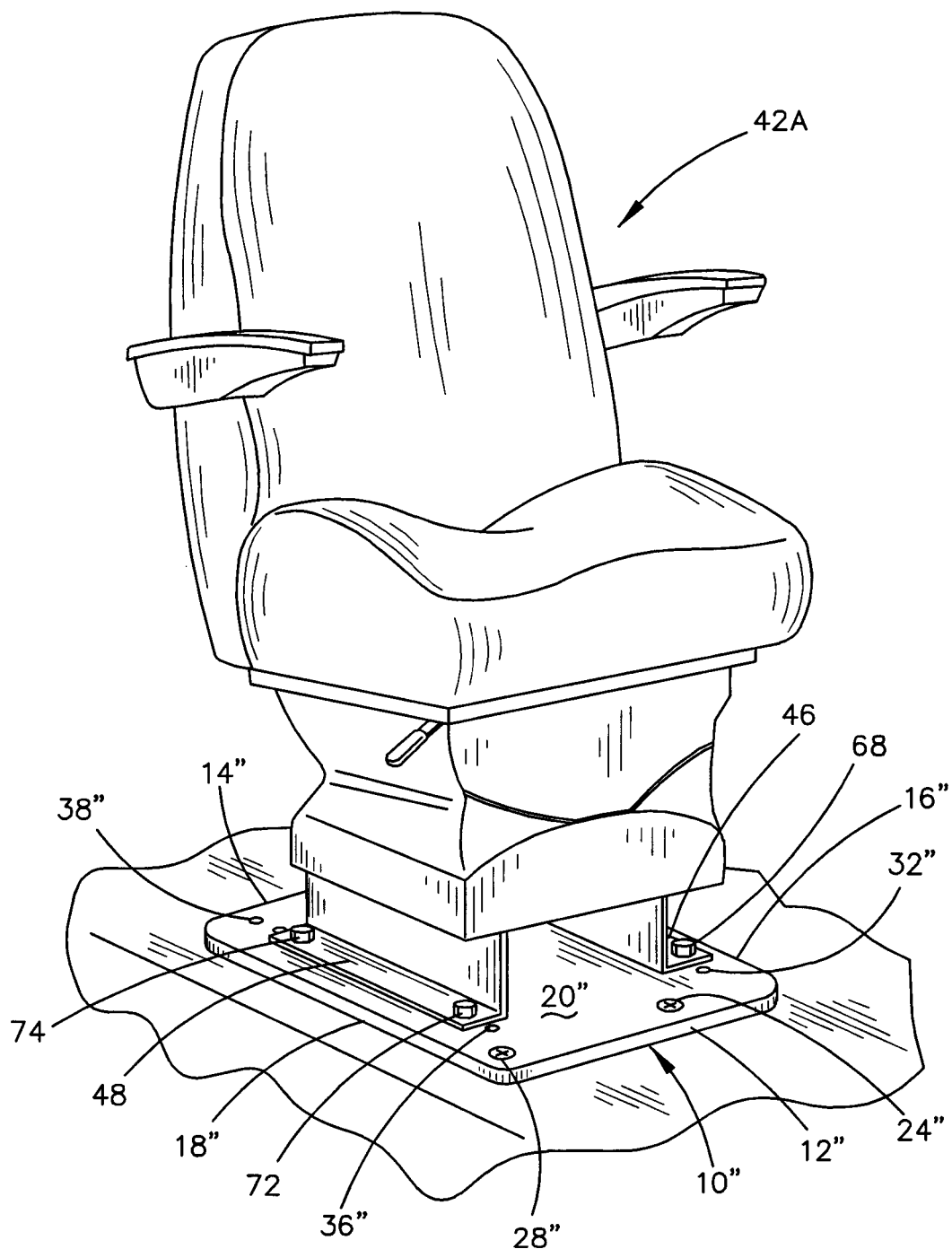

FIGS. 6, 8 and 10 illustrate a second embodiment of the adapter plate wherein the adapter plate thereof is designated with the reference numeral 10". The structure of adapter plate 10", which is identical to the structure of prior art adapter plate 10, is designated with "''". The adapter plate 10" is designed to be used with a passenger seat.

As stated in the prior art patent, the prior art adapter plate 10 is comprised of a metal material. Adapter plates 10' and 10" are also comprised of a metal material.

The prior art adapter plate 10 is flat and is generally rectangular in configuration. Prior art adapter plate 10 includes a forward end 12, rearward end 14, a first side 16, a second side 18, an upper side 20 and a lower side 22. Prior art adapter plate 10 has a chamfered bolt opening 24 formed therein rearwardly of the forward end 12 and which is spaced inwardly of side 16. Prior art adapter plate 10 also has a chamfered bolt opening 26 formed therein rearwardly of bolt opening 24. Prior art adapter plate 10 also has a chamfered bolt opening 28 formed therein rearwardly of the forward end 12 which is spaced inwardly of side 18. Prior art adapter plate 10 also has a chamfered bolt opening 30 formed therein rearwardly of the bolt opening 28.

Prior art adapter plate 10 has a first set of internally threaded or tapped bolt openings 32 which are positioned rearwardly of bolt opening 24. Preferably, the openings 32 are spaced one-inch apart. Prior art adapter plate 10 also has a second set of internally threaded or tapped bolt openings 34 which are positioned rearwardly of bolt opening 26. Prior art adapter plate 10 also has a third set of internally threaded or tapped bolt openings 36 formed therein which are positioned rearwardly of bolt opening 28. Prior art adapter plate 10 also has a fourth set of internally threaded or tapped bolt openings 38 formed therein which are positioned rearwardly of bolt opening 30. Preferably, the openings 32 are spaced one-inch apart as are bolt openings 34, 36 and 38.

Figure 1:
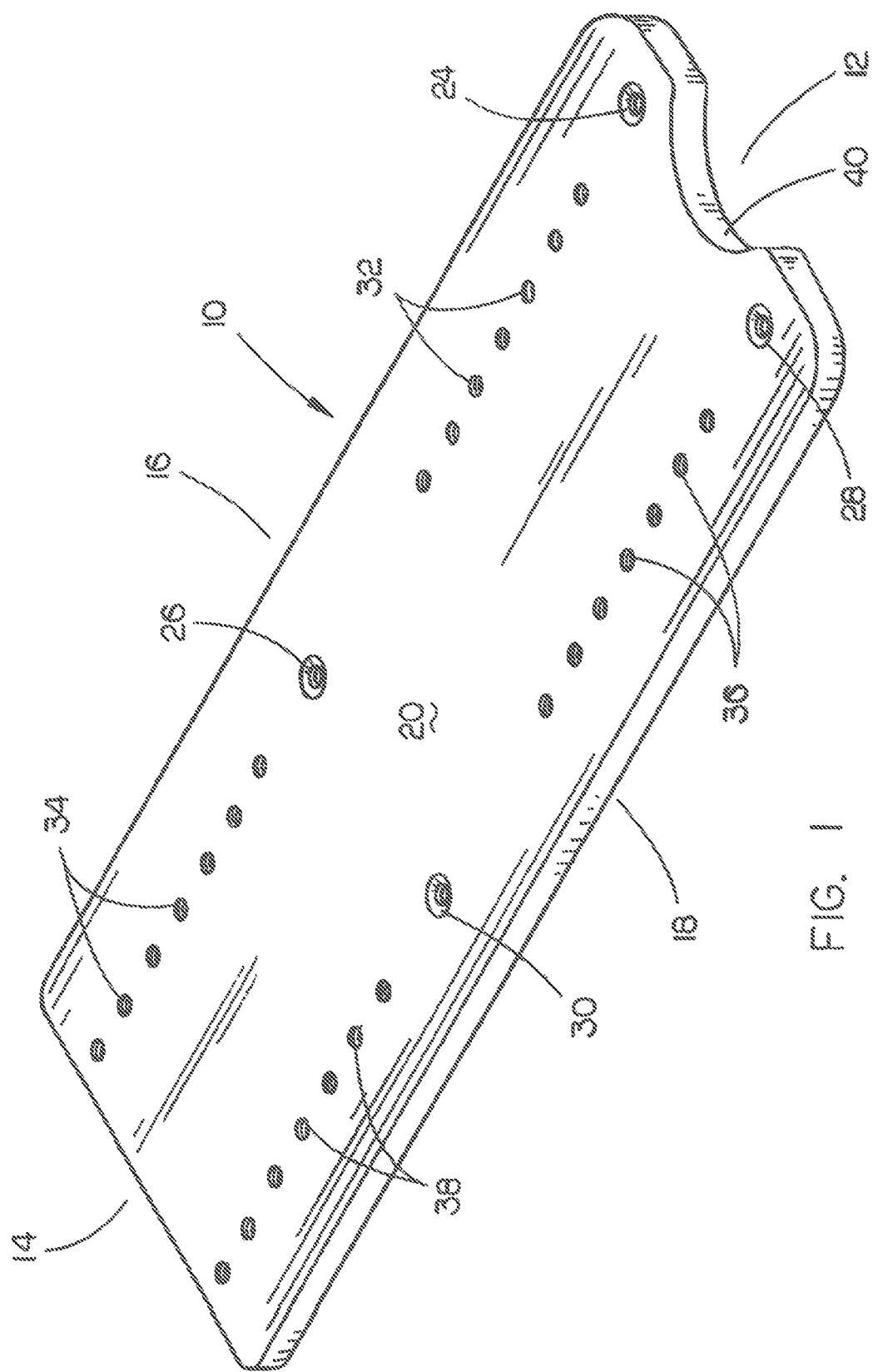
FIG. 1 is a perspective view of the prior art adapter plate of U.S. Pat. No. 9,073,451.
Figure 2:
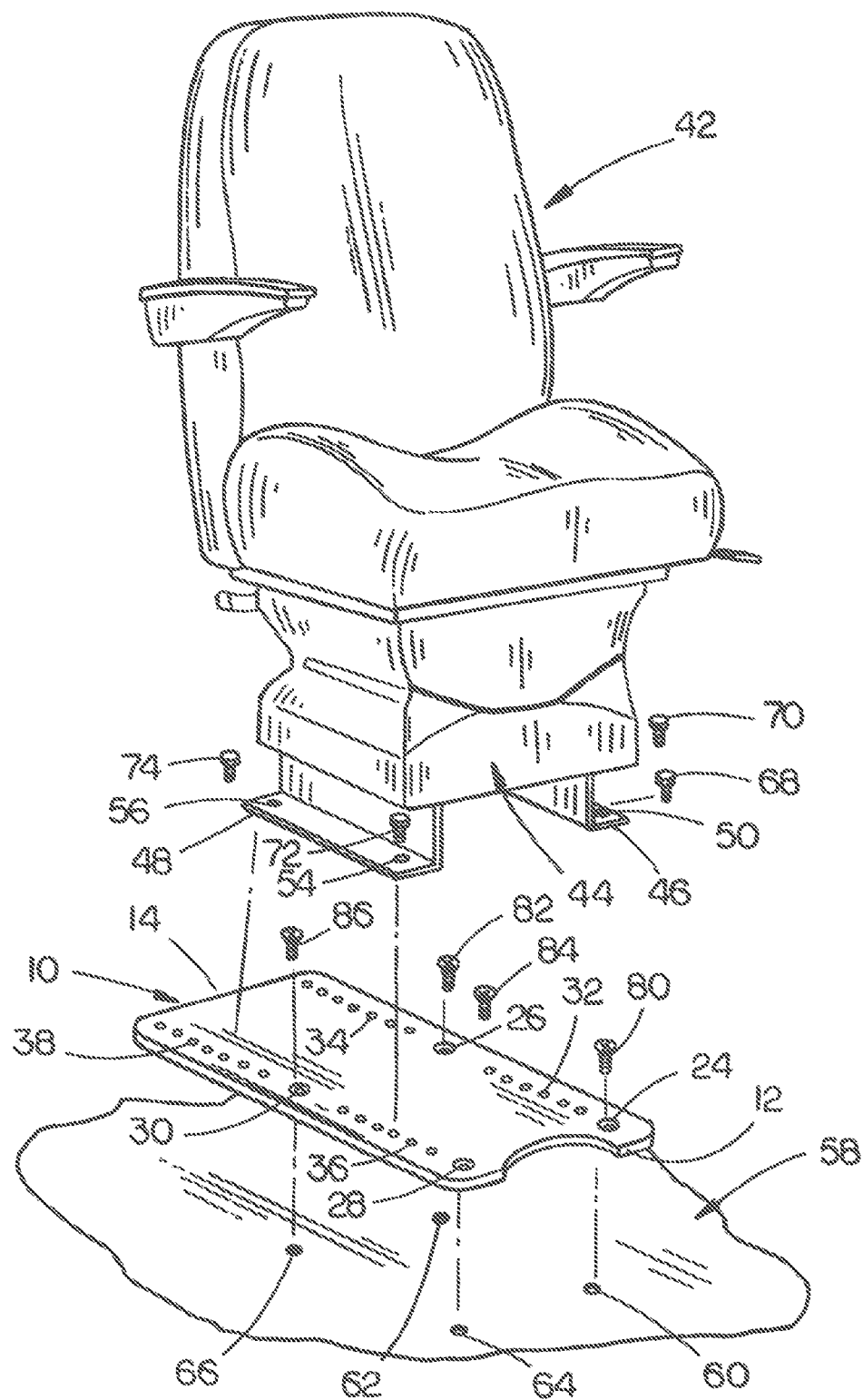
FIG. 2 is an exploded perspective view illustrating the manner in which the prior art adapter plate is imposed between the floor of a truck cab and a seat in the truck cab.

The prior art adapter plate 10 was designed to be used with a conventional truck seat 42 which includes a seat base 44 having mounting brackets or flanges 46 and 48 at the lower end thereof. Bracket 46 has spaced apart bolt openings 50 and 52 formed therein. Bracket 48 has spaced-apart bolt openings 54 and 56 formed therein. Seat 42 is normally secured to floor 58 of the driver's cab or compartment. Floor 58 has spaced-apart bolt openings 60, 62, 64 and 66 formed therein as seen in FIG. 2. Seat 42 is normally secured to floor 58 by bolts 68, 70, 72 and 74 extending downwardly through bolt openings 50, 52, 54 and 56 respectively and downwardly through bolt openings 60, 62, 64 and 66 in floor 58 respectively. Four nuts 76 are usually welded to the underside of the floor 58 beneath bolt openings 60, 62, 64 and 66 which normally threadably receive the lower ends of bolts 68, 70, 72 and 74 to secure the seat 42 to floor 58.

Although the prior art seats 42 include some form of slidable adjustment of the seat 42 rearwardly or forwardly with respect to floor 58, that adjustment is limited by the brackets 46 and 48 being secured to the floor.

In the prior art patent, the bolts 68, 70, 72 and 74 are threadably disconnected from the nuts 76. The seat 42 is then raised upwardly from floor 58 and temporarily moved to one side. Adapter plate 10 is then placed on floor 58 so that bolt openings 24, 26, 28 and 30 in adapter plate 10 register with bolt openings 60, 62, 64 and 66 respectively in floor 58. Bolts 80, 82, 84 and 86 are then inserted downwardly through bolt openings 24, 26, 28 and 30 respectively in adapter plate 10 and downwardly through bolt openings 60, 62, 64 and 66 respectively in floor 58 and threadably secured to the nuts 76.

The seat 42 is then placed upon the adapter plate 10 so that the bolt openings 50 and 54 register with the selected bolt openings in the first set of bolt openings 32 and the third set of bolt openings 36 in adapter plate 10. At that time, the bolt openings 52 and 56 in brackets 46 and 48 will register with corresponding bolt openings in the second and fourth sets of bolt openings 34 and 38. The positioning of the seat base 44 on the adapter plate 10 will depend upon the driver's choice. If the driver desires for the greatest amount of leg room possible, the bolt openings 50, 52 and 54, 56 will be positioned over the rearwardmost bolt openings in the first, second, third and fourth sets of bolt openings respectively. Bolts 68, 70, 72 and 74 will then be extended downwardly through bolt openings 50, 52, 54 and 56 respectively and threadably secured to the internally threaded bolt openings in the first, second, third and fourth sets of bolt openings. If the bolts 68, 70, 72 and 74 are too long or too short, different bolts will be utilized.

The adapter plate 10 enables a truck seat to be moved rearwardly of its normal rearwardmost position to provide additional and proper legroom for the driver of the truck.

Although the prior art adapter 10 functions extremely well, the outer armrest of the driver's seat may, in some cases, interfere with the closing of the driver's door as stated above. That is the reason that adapter plate 10' has been designed so that the driver's seat is moved inwardly somewhat from the driver's door so that the outer armrest of the driver's seat no longer interferes with the closing of the driver's door. If the prior art adapter plate 10 is used with a passenger seat, the outer armrest of the passenger's seat may, in some cases, interfere with the closing of the passenger's door. That is the reason that adapter plate 10" has been designed so that the passenger's seat is moved inwardly somewhat from the passenger's door so that the outer armrest of the passenger's seat will not interfere with the closing of the passenger door.

Figure 3:
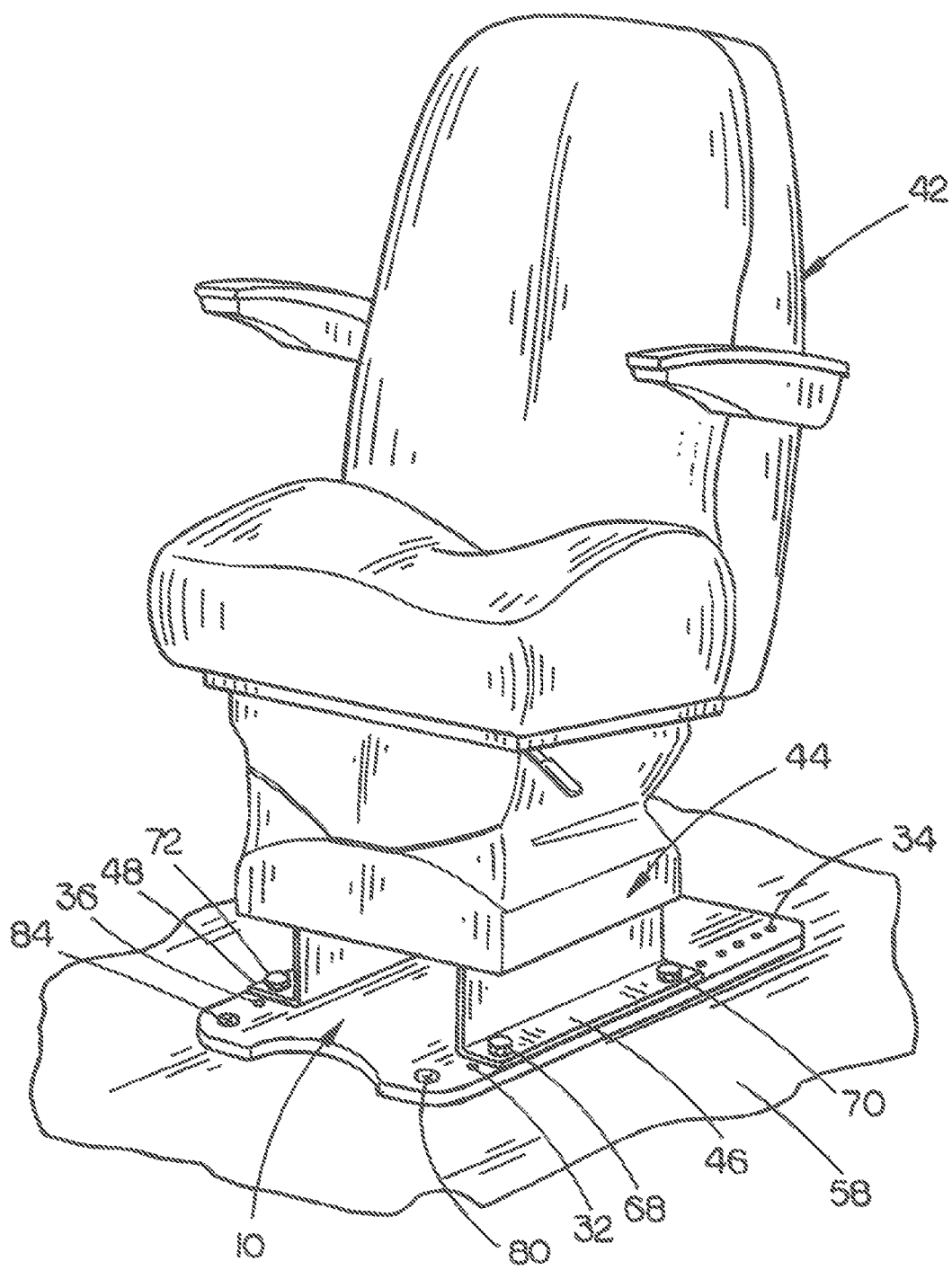
FIG. 3 is a perspective view illustrating the prior art adapter plate positioned between a truck cab floor and a seat in the cab of the truck.
Figure 4:
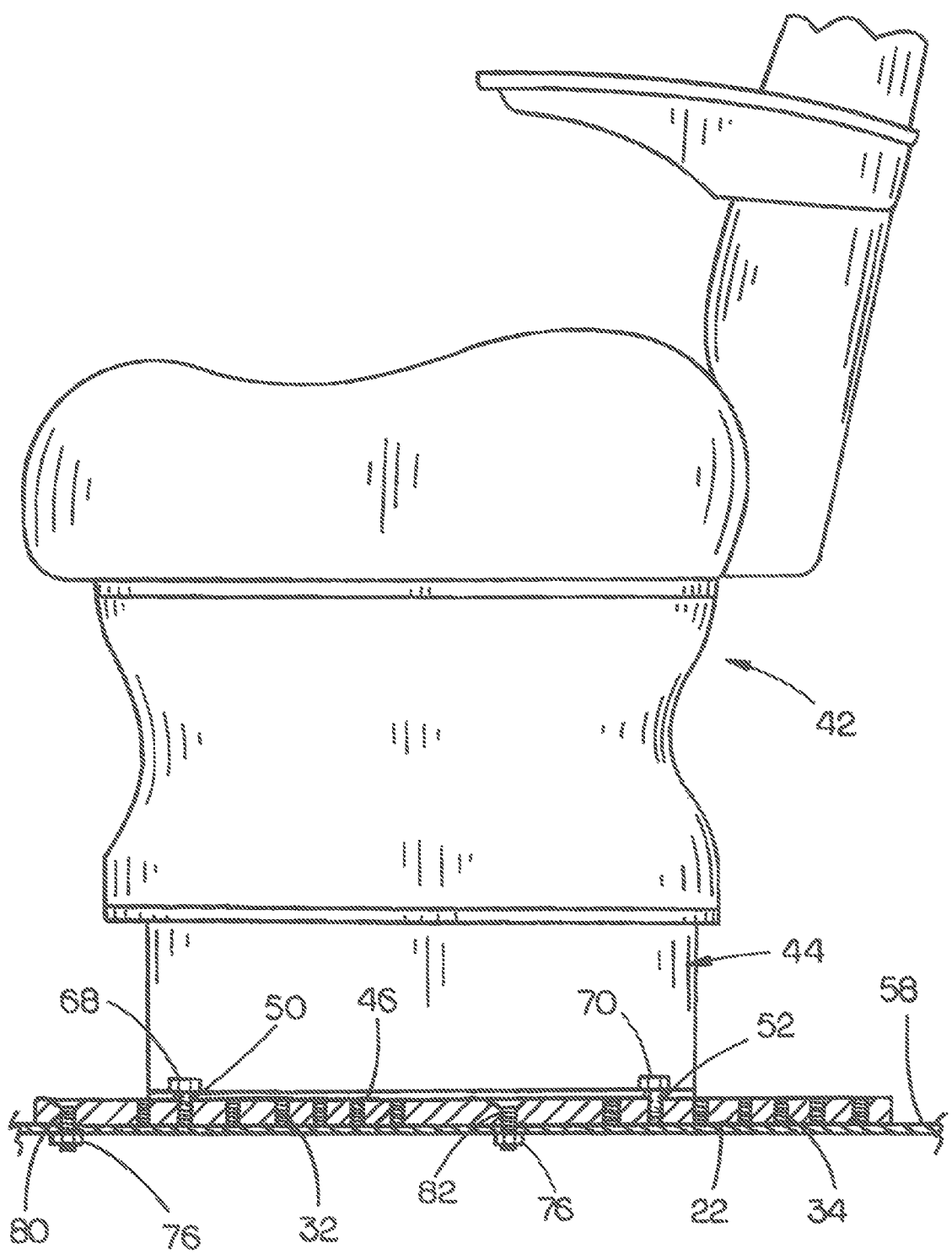
FIG. 4 is a perspective view illustrating the prior art adapter plate positioned between the seat and the floor of a vehicle such as a truck.

Referring now to FIGS. 5 and 7, the numbers thereon, which are identical with the numbers of FIG. 3, are indicated with "'". The primary difference of adapter plate 10' with respect to prior art adapter plate 10 is that the location of bolt openings 24', 26', 28' and 30' in adapter plate 10' is different than the location of the bolt openings 24, 26, 28 and 30 in prior art adapter plate 10 as will now be described.

Bolt opening 24' is positioned adjacent the forward end 12' of adapter plate 10' and is positioned adjacent side 16' of adapter plate 10'. Bolt opening 26' is positioned rearwardly of bolt opening 24' and is positioned adjacent side 16'. Bolt opening 28' is positioned inwardly of bolt opening 24' and is positioned adjacent forward end 12' of adapter plate 10'. Bolt opening 30' is positioned rearwardly of bolt opening 28' and is positioned inwardly of bolt opening 26'. Bolt openings 24', 26', 28' and 30' are configured to register with the bolt openings 60, 62, 64 and 66 respectively in floor 58. Adapter plate 10' is secured to the floor 58 in the same manner as prior art adapter plate 10 is secured to floor 58 with the same bolts and nuts. When adapter plate 10' is secured to floor 58, the side 16' will be positioned more inwardly than side 16 of prior art adapter plate 10 is positioned. The driver's seat 42 is secured to the adapter plate 10' in the same manner, with the same bolts and nuts, as the driver's seat 42 of FIGS. 1-4 is secured to the prior art adapter plate 10. The inward positioning of 24', 26', 28' and 30' results in the driver's seat being positioned further away from the driver's door than the driver's seat when attached to prior art adapter plate 10. The adapter plate 10' ensures that the outer armrest of the driver's seat will not interfere with the closure of the driver's door.

Referring now to FIGS. 6 and 8, the numbers thereon which are identical to the numbers on FIG. 3 are indicated with "''". Bolt openings 60, 62, 64 and 66 will also be formed in the floor 58 beneath the passenger seat. The primary difference of adapter plate 10" with respect to prior art adapter plate 10 is that the location of bolt openings 24", 26", 28" and 30" is different than the location of bolt openings 24, 26, 28 and 30 in the prior art adapter plate 10 as will now be described.

Bolt opening 28" is positioned adjacent forward end 12" of adapter plate 10" and is positioned adjacent side 18" of adapter plate 10". Bolt opening 30" is positioned rearwardly of bolt opening 28" adjacent side 18" of adapter plate 10". Bolt opening 24" is positioned inwardly of bolt opening 28" and is positioned adjacent forward end 12" of adapter plate 10". Bolt opening 26" is positioned rearwardly of bolt opening 24" and inwardly of bolt opening 30". Bolt openings 24", 26", 28" and 30" are configured to register with the bolt openings 60, 62, 64, and 66 respectively in floor 58. Adapter plate 10" is secured to the floor 58 in the same manner as prior art adapter plate 10 is secured to floor 58.

When adapter plate 10" is secured to floor 58, the side 18" of adapter plate 10" will be positioned more inwardly than side 18 of prior art adapter plate 10 is positioned. The passenger seat 42A is secured to the adapter plate 10" in the same manner, with the same bolts and nuts, as the seat 42 of FIGS. 1-4 is secured to the prior art adapter plate 10. The inward positioning of adapter plate 10" and bolt openings 24", 26", 28" and 30" results in the passenger seat being positioned further inwardly from the passenger's door to ensure that the outer armrest of the passenger seat 42A will not interfere with the closure of the passenger door.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. In combination with a vehicle including a floor in a driver's compartment with the floor having first, second, third and fourth bolt openings extending downwardly therethrough with the bolt openings normally receiving bolts extending therethrough to secure a seat base of a driver's seat to the floor inwardly of the driver's door, comprising:

a generally rectangular, flat adapter plate having a forward end with first and second ends, a first side with forward and rearward ends, said first side extends rearwardly from said first end of said forward end of said adapter plate, a second side, with forward and rearward ends, said second side extends rearwardly from said second end of said forward end of said adapter plate, and a rearward end, having first and second ends, said rearward end extends between said rearward ends of said first and second sides;

said adapter plate having a first bolt opening formed therein;

said first bolt opening being positioned adjacent said forward end of said adapter plate and being positioned adjacent said first side thereof;

said adapter plate having a second bolt opening formed therein rearwardly of said first bolt opening in said adapter plate;

said second bolt opening being positioned adjacent said first side of said adapter plate;

said adapter plate having a third bolt opening formed therein;

said third bolt opening being positioned adjacent said forward end of said adapter plate;

said third bolt opening in said adapter plate being spaced inwardly of said first bolt opening thereof;

said adapter plate having a fourth bolt opening formed therein which is spaced rearwardly of said third opening in said adapter plate;

said fourth bolt opening of said adapter plate being spaced inwardly of said second bolt opening of said adapter plate;

said third and fourth bolt openings of said adapter plate being positioned in said adapter plate approximately midway between said first and second sides of said adapter plate;

said first, second, third and fourth bolt openings of said adapter plate being configured to register with the first, second, third and fourth bolt openings in the floor respectively;

a first bolt extending downwardly through said first bolt opening in said adapter plate and downwardly through the first bolt opening in the floor;

a nut secured to said first bolt below the floor;

a second bolt extending downwardly through said second bolt opening in said adapter plate and downwardly through the second bolt opening in the floor;

a nut secured to said second bolt below the floor;

a third bolt extending downwardly through said third bolt opening in said adapter plate and downwardly through the third bolt opening in the floor;

a nut secured to said third bolt below the floor;

a fourth bolt extending downwardly through said fourth bolt opening in said adapter plate and downwardly through the fourth bolt opening in the floor;

a nut secured to said fourth bolt below the floor;

said adapter plate having a first row of spaced-apart adjustment openings, having internal threads, formed therein which are positioned rearwardly of said first bolt opening of said adapter plate;

said adapter plate having a second row of spaced-apart adjustment openings, having internal threads, formed therein which are positioned rearwardly of said second bolt opening of said adapter plate;

said adapter plate having a third row of spaced-apart adjustment openings, having internal threads, formed therein which are positioned rearwardly of said third bolt opening of said adapter plate;

said adapter plate having a fourth row of spaced-apart adjustment openings, having internal threads, formed therein which are positioned rearwardly of said fourth bolt opening of said adapter plate;

the individual bolt openings of said first, second, third and fourth rows of adjustment openings being configured to selectively and threadably receive bolts extending downwardly from the seat base to enable the seat base and seat to be selectively adjustably rearwardly positioned with respect to the first, second, third and fourth bolt openings in the floor to increase the leg room for a driver; and the positioning of said first, second, third and fourth bolt openings in said adapter plate causing the driver's seat to be moved inwardly away from the driver's door to prevent the driver's seat from interfering with the closure of the driver's door.

2. The combination of claim 1 wherein said first, second, third and fourth bolt openings in said adapter plate are chamfered openings.

3. In combination with a vehicle including a floor in a driver's compartment with the floor having first, second, third and fourth bolt openings extending downwardly therethrough with the bolt openings normally receiving bolts extending therethrough to secure a seat base of a passenger's seat to the floor, inwardly of the passenger's door, comprising:

a generally rectangular, flat adapter plate having a forward end with first and second ends, a first side with forward and rearward ends, said first side extends rearwardly from said first end of said forward end of said adapter plate, a second side, with forward and rearward ends, said second side extends rearwardly from said second end of said forward end of said adapter plate, and a rearward end, having first and second ends, said rearward end extends between said rearward ends of said first and second sides;

said adapter plate having a first bolt opening formed therein;

said first bolt opening being positioned adjacent said forward end of said adapter plate and being adjacent said second side of said adapter plate;

said adapter plate having a second bolt opening formed therein rearwardly of said first bolt opening;

said second bolt opening of said adapter plate being positioned adjacent said second side of said adapter plate;

said adapter plate having a third bolt opening formed therein;

said third bolt opening of said adapter plate being positioned adjacent said forward end of said adapter plate;

said third bolt opening of said adapter plate being spaced inwardly of said first bolt opening of said adapter plate;

said adapter plate having a fourth bolt opening formed which is spaced rearwardly of said third bolt opening;

said third and fourth bolt openings of said adapter plate being positioned in said adapter plate approximately midway between said first and second sides of said adapter plate:

said first, second, third and fourth bolt openings of said adapter plate being configured to register with the first, second, third and fourth bolt openings in the floor respectively;

a first bolt extending downwardly through said first bolt opening in said adapter plate and downwardly through the first bolt opening in the floor;

a nut secured to said first bolt below the floor;

a second bolt extending downwardly through said second bolt opening in said adapter plate and downwardly through the second bolt opening in the floor;

a nut secured to said second bolt below the floor;

a third bolt extending downwardly through said third bolt opening in said adapter plate and downwardly through the third bolt opening in the floor;

a nut secured to said third bolt below the floor;

a fourth bolt extending downwardly through said fourth bolt opening in said adapter plate and downwardly through the fourth bolt opening in the floor;

a nut secured to said fourth bolt below the floor;

said adapter plate having a first row of spaced-apart adjustment openings, having internal threads, formed therein which are positioned rearwardly of said first bolt opening of said adapter plate;

said adapter plate having a second row of spaced-apart adjustment openings, having internal threads, formed therein which are positioned rearwardly of said second bolt opening of said adapter plate;

said adapter plate having a third row of spaced-apart adjustment openings, having internal threads, formed therein which are positioned rearwardly of said third bolt opening of said adapter plate;

said adapter plate having a fourth row of spaced-apart adjustment openings, having internal threads, formed therein which are positioned rearwardly of said fourth bolt opening of said adapter plate;

the individual bolt openings of said first, second, third and fourth rows of adjustment openings being configured to selectively and threadably receive bolts extending downwardly from the seat base to enable the seat base and seat to be selectively adjustably rearwardly positioned with respect to the first, second, third and fourth bolt openings in the floor to increase the leg room for a driver; and the positioning of said first, second, third and fourth bolt openings in said adapter plate causing the passenger seat to be moved inwardly away from the passenger door to prevent the passenger's seat from interfering with the closure of the passenger's door.

4. The combination of claim 3 wherein said first, second, third and fourth bolt openings in said adapter plate are chamfered openings.

* * * * *